United States Patent [19]
Morita

[11] Patent Number: 5,707,022
[45] Date of Patent: Jan. 13, 1998

[54] CASSETTE CASE FOR CONTAINING MAGNETIC TAPE

[75] Inventor: Kiyoo Morita, Kanagawa, Japan

[73] Assignee: Fuji Photo Film Co., Ltd., Kanagawa, Japan

[21] Appl. No.: 757,344

[22] Filed: Nov. 27, 1996

[30] Foreign Application Priority Data

Nov. 30, 1995 [JP] Japan .................................. 7-312605

[51] Int. Cl.$^6$ ................................................ G11B 23/087
[52] U.S. Cl. ................................................ 242/347.1
[58] Field of Search .............................. 242/347, 347.1; 360/132

[56] References Cited

U.S. PATENT DOCUMENTS

| | | | |
|---|---|---|---|
| 4,382,522 | 5/1983 | Shimazu et al. | 242/344 |
| 4,382,523 | 5/1983 | Sekine et al. | 242/344 |
| 5,198,951 | 3/1993 | Fujii | 242/347.1 |
| 5,299,755 | 4/1994 | Fujii | 242/347.1 |

*Primary Examiner*—John P. Darling
*Attorney, Agent, or Firm*—McAulay Fisher Nissen Goldberg & Kiel, LLP

[57] ABSTRACT

There is provided a cassette case for containing a magnetic tape therein, including (a) a pair of cassette halves, the cassette halves being formed with a front opening through which a magnetic tape is to be exposed, (b) a pair of reels disposed in the cassette halves for rotation, (c) a magnetic tape wound around the reels, and (d) a guard panel including a front panel and a pair of side panels integral with the front panel at opposite ends thereof. The side panels is carried at the cassette halves so that the guard panel can rotate relative to the cassette halves and thereby the front panel opens and closes the opening. The front panel is formed with thicker-walled portions at each of which a groove is formed for locking the guard panel to the cassette halves. The front panel is formed with recesses closer to a proximal end of the front panel than the grooves, the recesses extending in a widthwise direction of the front panel.

8 Claims, 3 Drawing Sheets

CASSETTE CASE FOR CONTAINING MAGNETIC TAPE

BACKGROUND OF THE INVENTION

The present invention relates to a cassette case including a guard panel which shuts off an opening formed with the cassette case and which includes a front panel and two side panels formed integrally with the-front panel at opposite ends thereof, which front panel is formed a groove for locking the guard panel to the cassette case.

There has been conventionally used a magnetic tape cassette for audio equipments and video equipments. In such a magnetic tape cassette, a pair of reels or hubs around which a magnetic tape is wound are supported so that the magnetic tape is able to run in a cassette case, to thereby reproduce data recorded in the magnetic tape. Among a number of magnetic tapes, a magnetic tape cassette to be used for a video equipment such as VHS-type, β-type and 8 mm videos includes upper and lower cassette halves made of ABS (acrylonitrile-butadiene styrene) resin and integrally formed with each other, and a pair of rotatable reels or hubs around which a magnetic tape is wound and which are disposed within the upper and lower cassette halves.

FIG. 1 illustrates a conventional VHS-type magnetic tape cassette 100 for business use. The illustrated magnetic cassette tape 100 includes a main cassette body 101, a magnetic tape 104, a pair of reels (not illustrated) around which the magnetic tape 104 is wound, and a guard panel 106. The main cassette body 101 consists of an upper cassette half 102 and a lower cassette half 103. The main cassette body 101 is formed with a front opening 105 through which the magnetic tape 104 is exposed. The guard panel 106 is comprised of a front panel 107 and two side panels 110 integral with the front panel 107 at opposite ends thereof. The side panels 110 are carried at the main cassette body 101 so that the guard panel 106 can rotate in directions A and B relative to the main cassette body 101. Thus, when the guard panel 106 is made to rotate in a direction indicated with an arrow A, the front opening 105 is exposed, whereas when the guard panel 106 is made to rotate in a direction indicated with an arrow B, the front opening 105 is shut off with the front panel 107 of the guard panel 106.

As illustrated in FIG. 2, the front panel 107 of the guard panel 106 is formed at a bottom surface thereof with thicker-walled portions 108 having a certain width. A groove 109 is formed at each of the thicker-walled portions 108 for locking the guard panel 106 to the main cassette body 101. The reason why the front panel 107 is locked is that the front panel 107 is likely to be deformed, if the side panels 110 are locked like a household magnetic tape cassette, since the magnetic tape cassette 100 for business use is relatively large in size and has a relatively lengthy guard panel.

However, there arise problems in the above mentioned conventional magnetic tape cassette that there is likely to occur distortion on a surface of the front panel 107 while the guard panel 106 is being molded, resulting in that there arises irregularity on the surface of the front panel 107 and that dimensional stability of the front panel 107 gets worse, because a thickness of the thicker-walled portions 108 of the guard panel 106 tremendously changes. If there is irregularity on a surface of the front panel 107 of the guard panel 106, it would be difficult to print signs and/or letters on the surface.

In addition, there arises another problem in the above mentioned conventional magnetic tape cassette that since a guard panel is elongated in shape, it is likely to incline in position when it is taken out of a die, thereby there often occur mistakes when a guard panel is to be taken out with a chuck.

SUMMARY OF THE INVENTION

In view of problems found in a conventional magnetic tape cassettes, it is an object of the present invention to provide a cassette case for containing a magnetic tape therein, which is capable of preventing occurrence of distortion in a thicker-walled portion of a guard panel.

Another object of the present invention is to provide a cassette case for containing a magnetic tape therein, which has a guard panel which can be taken out of a die without any mistakes in doing so.

There is provided a cassette case for containing a magnetic tape therein, including a pair of cassette halves, the cassette halves being formed with a front opening through which a magnetic tape is to be exposed, a pair of reels disposed in the cassette halves for rotation, a magnetic tape wound around the reels, and a guard panel including a front panel and a pair of side panels integral with the front panel at opposite ends thereof. The side panels are carried at the cassette halves so that the guard panel can rotate relative to the cassette halves and thereby the front panel Opens and closes the opening. The front panel is formed with thicker-walled portions at each of which a groove is formed for locking the guard panel to the cassette halves. The front panel is formed with recesses closer to a proximal end of the front panel than the grooves, the recesses extending in a widthwise direction of the front panel.

In a preferred embodiment, the above mentioned widthwise direction is the same as a direction in which the guard panel is pulled out of a die after the guard panel has been molded.

In another preferred embodiment, the thicker-walled portions are formed by two.

In still another preferred embodiment, the thicker-walled portions are disposed at longitudinal ends of the front panel.

In yet another preferred embodiment, the thicker-walled portions are symmetrically disposed.

In accordance with the above mentioned cassette case, since the thicker-walled portion of the guard panel is formed with a recess, it is possible to make a thickness smaller around the recess to thereby reduce thickness change. Accordingly, it is possible to prevent occurrence of distortion while a guard panel is being molded.

In addition, a die has to have a raised portion in order to form a recess in a guard panel. The raised portion can act as a guide when a guard panel is taken out of a die, ensuring that there will be no mistakes in taking out a guard panel with a chuck.

DETAILED DESCRIPTION OF THE PREFERRED EMBODIMENTS

A preferred embodiment in accordance with the present invention will be explained hereinbelow with reference to FIGS. 3 to 6.

Figure 1:
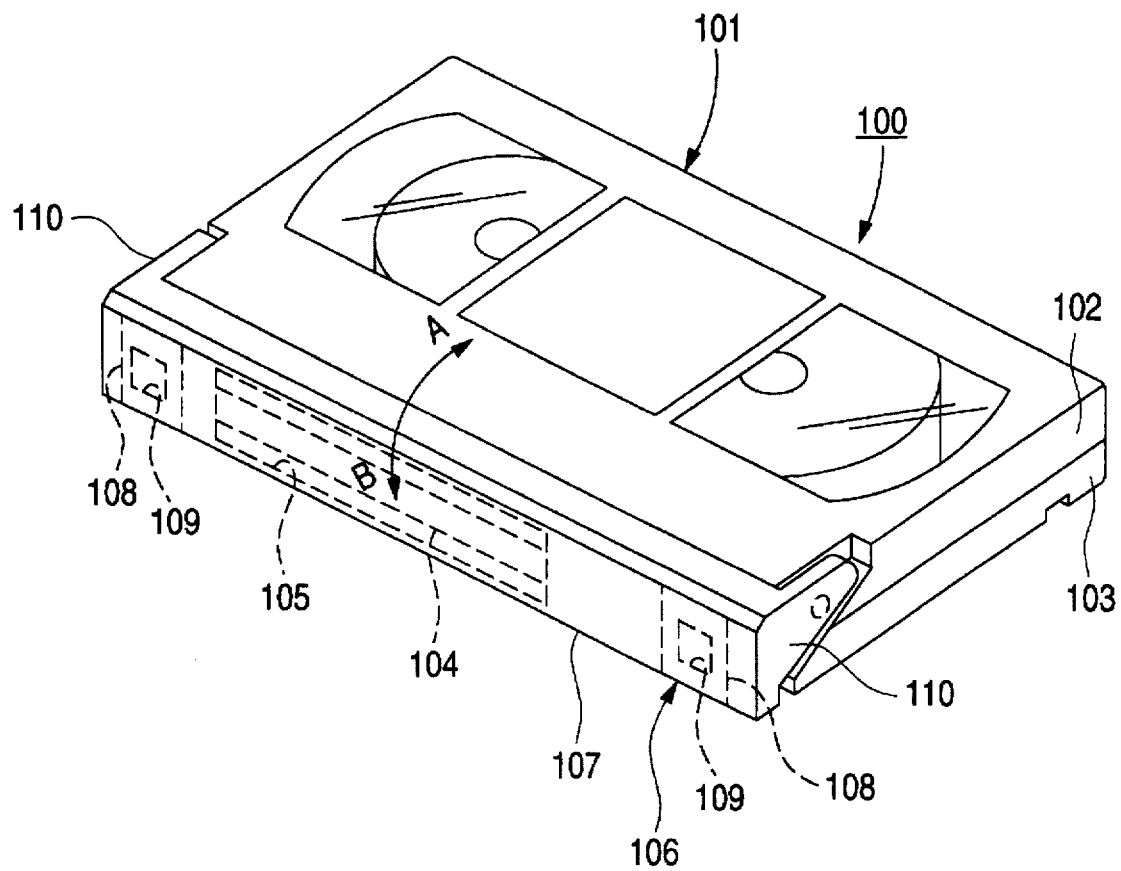
FIG. 1 is a perspective view of a conventional magnetic tape cassette.
Figure 2:
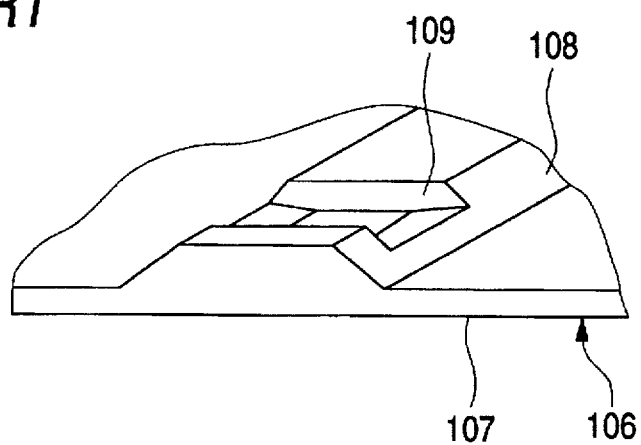
FIG. 2 is an enlarged perspective view of a thicker-walled portion of a guard panel.
Figure 3:
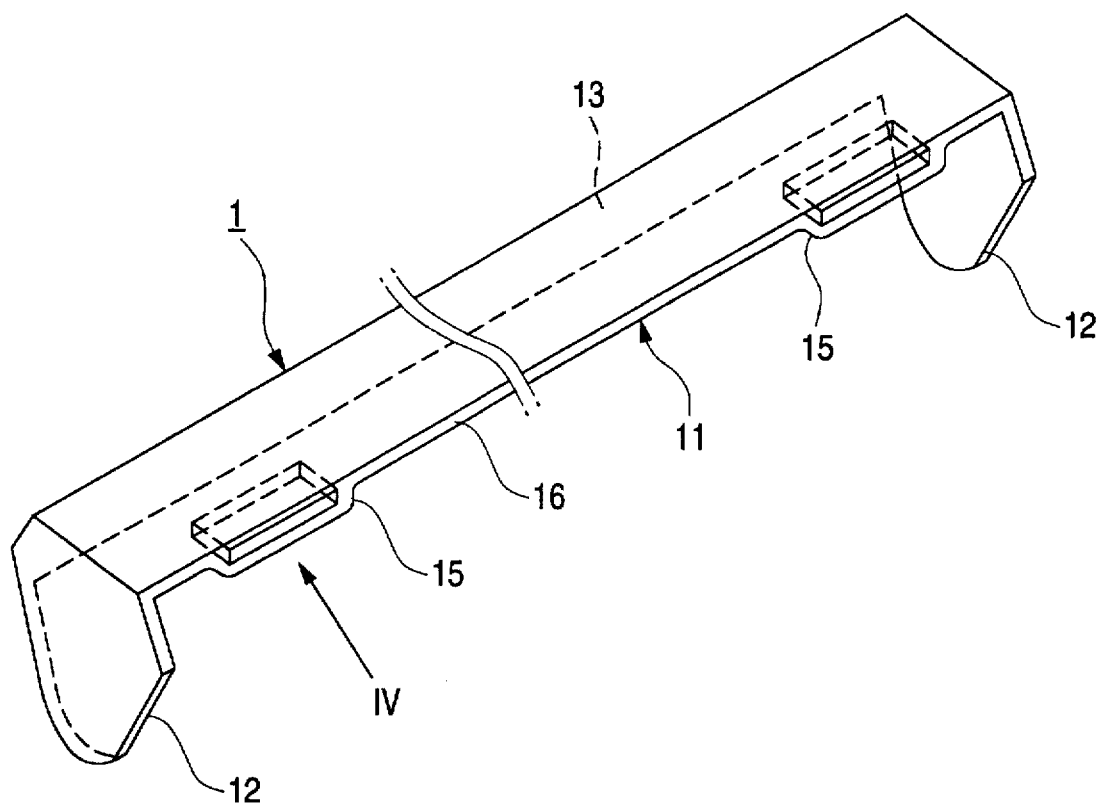
FIG. 3 is a perspective view of a guard panel constituting a part of a cassette case in accordance with the present invention.

As illustrated in FIG. 3, a guard panel 1 constituting a part of a cassette case in accordance with the present invention is comprised of a front panel 11, a pair of side panels 12 formed integrally with the front panel 11 at its opposite ends, and an upright panel 13 formed integrally with the front panel 11 at its front end. Each of the side panels 12 is formed with an inwardly extending shaft (not illustrated) with which the side panels 12 is carried at a main cassette body (see FIG. 1) for pivotal movement. The main cassette body 101 is formed with a front opening 105 (see FIG. 1) through which the magnetic tape 104 is exposed. The guard panel 1 can rotate relative to the main cassette body 101. Thus, when the guard panel 1 is made to rotate, the front opening 105 is exposed or shut off in dependence on a direction in which the guard panel 1 is rotated.

Figure 4:
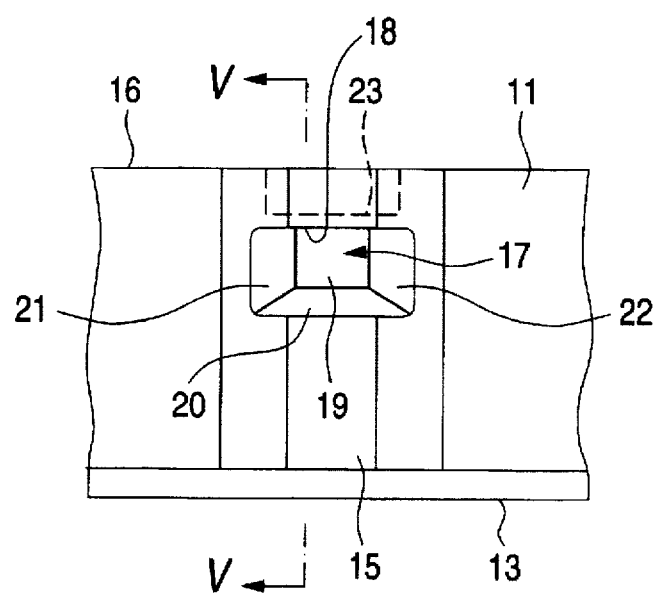
FIG. 4 is an enlarged view as viewed in a direction indicated with arrow IV in FIG. 3.
Figure 5:
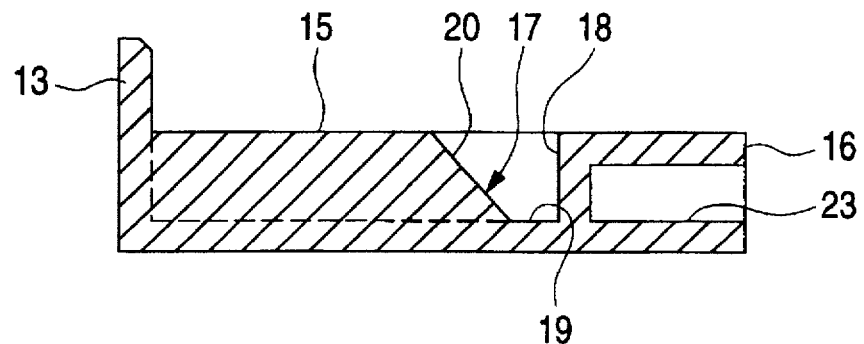
FIG. 5 is a cross-sectional view taken along line V—V in FIG. 4.

The front panel 11 is formed close to opposite ends thereof with thicker-walled portions 15 having a certain width. Each of the thicker-walled portions 15 is formed a groove 17 at a certain distance from an edge 16 of the front panel 11, as illustrated in FIG. 4. The groove 17 is for locking the guard panel 1 to the main cassette body 101. As illustrated in FIGS. 4 and 5, the groove 17 is defined by a front wall 18, a bottom surface 19, a rear wall 20, and sidewalls 21 and 22. The front wall 18 extend perpendicularly to the bottom surface 19, whereas the rear wall 20 makes an angle at the bottom surface 19. The sidewalls 21 and 22 also make an angle at the bottom surface 19, as illustrated in FIG. 4. Between the grooves 17 and the edges 16 are formed recesses 23 having a certain depth and open to the edge 16. The formation of the recesses 23 ensures that a thickness around the recesses 23 is below a predetermined value.

Figure 6:
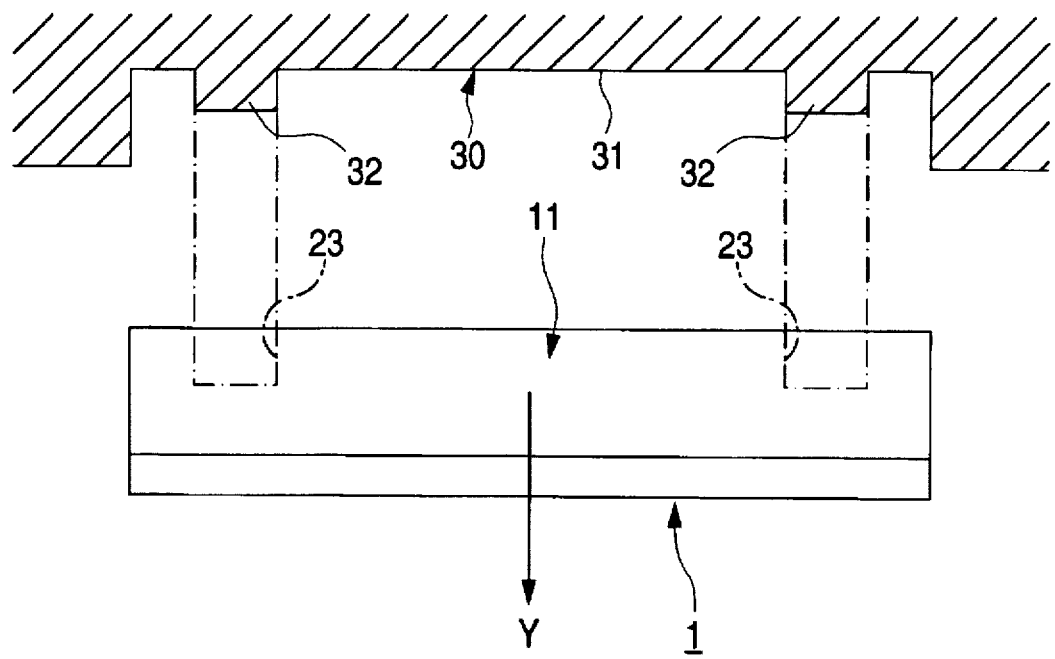
FIG. 6 is a plan view showing how the guard panel illustrated in FIG. 3 is taken out of a die.

After the guard panel 1 has been molded, the guard panel 1 is taken out of a die 30 in a direction indicated with an arrow Y, as illustrated in FIG. 6. The recesses 23 of the guard panel 1 is formed by cores 32 projecting from a bottom surface 31 of the die 30. That is, the recesses 23 extend in a direction in which the molded guard panel 1 is taken out of the die 30, and is open to the edge 16.

As mentioned above, since the guard panel 1 is formed with recesses 23 which extend in a direction in which the molded guard panel is taken out of the die 30 and are disposed closer to the edge 16 than the grooves 17 of the thicker-walled portions 15, a thickness around the recesses 23 can be made smaller with the result of smaller thickness changes. Accordingly, it is possible to prevent occurrence of distortion around the recesses 23 while the guard panel 1 is being molded, and hence the front panel 11 can have a flat surface, on which various signs and/or letters can be readily printed.

Since the cores 32 are inserted into the recesses 23, the cores 32 can act as a guide when the guard panel 1 is to be taken out of the die 30. Thus, it is possible to keep the guard panel 1 in the same position for hours, resulting in that the front panel 11 can be prevented from being inclined. Hence, the guard panel 1 can be molded in good condition. In addition, since it is possible to prevent occurrence of distortion in molding a guard panel, the dimensional stability can be enhanced.

In accordance with the present invention, the thicker-walled portion of the guard panel is formed with a recess. Hence, it is possible to make a thickness smaller around the recess to thereby reduce thickness change. Accordingly, it is possible to prevent occurrence of distortion while a guard panel is being molded.

In addition, a die has to have a raised portion in order to form a recess in a guard panel. The raised portion can act as a guide when a guard panel is taken out of a die, ensuring that there will be no mistakes in taking out a guard panel with a chuck.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A cassette case for containing a magnetic tape therein, comprising:

a pair of cassette halves, said cassette halves being formed with a front opening through which a magnetic tape is to be exposed;

a pair of reels disposed n said cassette halves for rotation;

a magnetic tape wound around said reels; and a guard panel including a front panel and a pair of side panels integral with said front panel at opposite ends thereof, said side panels being carried at said cassette halves so that said guard panel can rotate relative to said cassette halves and thereby said front panel opens and closes said opening, said front panel being formed with thicker-walled portions at each of which a groove is formed for locking said guard panel to said cassette halves, said front panel being formed with recesses closer to a proximal end of said front panel than said grooves, said recesses extending in a widthwise direction of said front panel.

2. The cassette case as set forth in claim 1, wherein said widthwise direction is the same as a direction in which said guard panel is pulled out of a die after said guard panel has been molded.

3. The cassette case as set forth in claim 2, wherein said thicker-walled portions are formed by two.

4. The cassette case as set forth in claim 3, wherein said thicker-walled portions are disposed at longitudinal ends of said front panel.

5. The cassette case as set forth in claim 4, wherein said thicker-walled portions are symmetrically disposed.

6. The cassette case as set forth in claim 1, wherein said thicker-walled portions are formed by two.

7. The cassette case as set forth in claim 6, wherein said thicker-walled portions are disposed at longitudinal ends of said front panel.

8. The cassette case as set forth in claims 7, wherein said thicker-walled portions are symmetrically disposed.

\* \* \* \* \*